United States Patent

Ranken et al.

[11] Patent Number: 6,059,527
[45] Date of Patent: May 9, 2000

[54] LIFTING SYSTEMS FOR USE WITH VEHICLES

[75] Inventors: James Paterson Ranken, Morrison; Richard John Lyons, Invermay, both of Australia

[73] Assignees: Ranken Research Pty. Ltd., Morrison; Dark Horse Pty. Ltd., Ballarat; Garry Neil Lyons, Ballarat; as joint trustee of the Garry and Denise Lyons Family Trust; Denise Lyons, Ballarat, all of Australia; as joint trustee of the Garry and Denise Lyons Family Trust

[21] Appl. No.: 09/125,773

[22] Filed: Oct. 26, 1998

[30] Foreign Application Priority Data

Feb. 23, 1996 [AU] Australia .................................. PN8240

[51] Int. Cl.$^7$ ...................................................... B60P 1/44
[52] U.S. Cl. ........................................... 415/545; 414/540
[58] Field of Search .................... 414/541, 545, 414/557, 558, 540, 549, 544

[56] References Cited

U.S. PATENT DOCUMENTS

| | | |
|---|---|---|
| 2,088,648 | 8/1937 | Hansen . |
| 2,158,596 | 5/1939 | Swanson . |
| 2,527,818 | 10/1950 | Ives . |
| 2,536,080 | 1/1951 | Patton ..................................... 414/545 |
| 2,640,612 | 6/1953 | Barry ...................................... 414/545 |
| 2,674,384 | 4/1954 | Galloway ................................ 414/541 |
| 2,698,103 | 12/1954 | Rostine ................................... 414/545 |
| 2,921,700 | 1/1960 | Reed, Jr. . |
| 2,950,073 | 8/1960 | McLain et al. .......................... 414/540 |
| 3,275,170 | 9/1966 | MacRae et al. ......................... 414/545 |
| 3,416,677 | 12/1968 | Abfalter ................................... 414/545 |
| 3,734,239 | 5/1973 | Martin et al. ........................... 414/545 |
| 3,800,915 | 4/1974 | Himes ..................................... 414/545 |
| 4,007,844 | 2/1977 | Perkins ................................... 414/541 |
| 4,083,429 | 4/1978 | Abbott .................................... 414/541 |
| 4,239,440 | 12/1980 | James ...................................... 414/540 |
| 4,265,586 | 5/1981 | Couture ................................... 414/545 |
| 4,806,062 | 2/1989 | Stier ........................................ 414/545 |

FOREIGN PATENT DOCUMENTS

0 715 986 A1  6/1996  European Pat. Off. .

*Primary Examiner*—Steven A. Bratlie
*Attorney, Agent, or Firm*—Knobbe, Martens, Olson & Bear, LLP

[57] ABSTRACT

A rear loading system for vehicles where a platform (16) is raised from the ground to a position level with the tray (2) of the vehicle. Typically the platform is raised by turning handle (32) which turns a shaft hidden in frame member (20) of U-shaped frame (4). The shaft in turn rotates a sprocket of an endless chain hidden in frame member (22). All four lifting cables (18a–d) run over pulleys in the U-frame and are attached to the endless chain so that on turning of the handle all of the cables are pulled by exactly the same distance and the platform rises in a horizontal attitude. When level with U-frame (4) the platform (16) can be locked thereto and frame and platform can be pivoted to a vertical position to act as a tail gate.

30 Claims, 11 Drawing Sheets

LIFTING SYSTEMS FOR USE WITH VEHICLES

FIELD OF THE INVENTION

The present invention relates to lifting systems for use with vehicles and more particularly to a lifting system comprising a lifting platform associated with a tray of a load carrying vehicle to facilitate loading and unloading of the tray.

DESCRIPTION OF THE RELATED ART

Loading systems for vehicles have been proposed in the form of a platform mounted at the rear of the vehicle for movement between the ground and a raised position adjacent a tray of the vehicle. In such systems, the platform is raised and lowered by operation of one or more hydraulic cylinders. The overall structure consisting of the tray, hydraulic cylinders and associated guide tracks is relatively expensive. A system of this type would normally be permanently attached to the vehicle and even if the system has provision for folding the platform into a storage condition when not in use, the overall system is still relatively bulky.

A lower cost alternative to a hydraulically operated lifting platform of the type discussed above can involve the use of a hydraulically operated hoist mounted at the rear of the vehicle. Although less expensive than currently available hydraulically operated lifting platforms, nevertheless a hydraulic hoist still represents a significant cost and is not particularly convenient in use.

In U.S. Pat. No. 2,088,648 (Hansen) and U.S. Pat. No. 2,527,818 (Ives) there are proposed lifting systems comprising a platform supported from the vehicle via a swinging arm linkage which can be manually operated to raise and lower the platform. Each of these systems is relatively cumbersome and requires permanent attachment to the vehicle.

SUMMARY OF THE INVENTION

According to the present invention there is provided a lifting system for attachment to a vehicle having a load carrying tray, said system comprising a support frame arranged for attachment to the vehicle, a load carrying platform suspended from the support frame by several flexible elements extending from the frame, and means for extending and retracting the flexible elements relative to the support frame so as to raise and lower the platform vertically relative to the frame from a position in which the platform is adjacent the tray of the vehicle and a position in which the platform is adjacent the ground, said flexible elements maintaining the platform in a substantially horizontal orientation during its vertical movement.

Further according to the invention there is provided a lifting system for attachment to a vehicle having a load carrying tray, said system comprising support means arranged for attachment to the vehicle, a load carrying platform suspended from the support means by at least four flexible elements so positioned that the platform is maintained level irrespective of the load distribution on the platform, and means for extending and retracting the flexible elements relative to the support means so as to raise and lower the platform vertically relative to the frame from a position in which the platform is adjacent the tray of the vehicle and a position in which the platform is adjacent the ground.

Still further according to the invention there is provided a lifting system for attachment to a vehicle having a load carrying tray, said system comprising a support structure arranged for releasable attachment to the vehicle, a load carrying platform suspended from the support structure by several flexible elements extending from the structure, and means carried by the structure for extending and retracting the flexible elements relative to the support structure so as to raise and lower the platform vertically relative to the structure from a position in which the platform is adjacent the tray of the vehicle and a position in which the platform is adjacent the ground, said flexible elements forming the sole means by which the platform is supported, said flexible elements maintaining the platform in a substantially horizontal orientation during its vertical movement.

In a lifting system in accordance with the invention the platform is supported from the frame by the flexible elements which preferably consist of cables, chains, ropes, webbing, straps or a combination thereof. The elements are extended and retracted relative to the frame or other support means to not only raise and lower the platform but also maintain the orientation of the platform without the need for an external guide linkage such as a swinging arm linkage. This can lead to a significant reduction in the overall size and complexity of the lifting system and when the platform is in its raised condition the system can feature significant compactness.

In a particularly preferred embodiment of the invention the platform is carried by a frame of substantially U-shape mountable at the rear of the vehicle substantially at the level of the load carrying tray. The platform is of rectangular shape having a width which corresponds to the spacing between opposed longitudinal frame members of the U-shaped frame so that when the platform is in its raised position it can lie between those frame members. Preferably the depth of the platform is substantially comparable with that of the frame members for further compactness of construction.

In the preferred embodiment, the frame members consist of tubular sections, for example sections of rectangular shape through the interior of which the cables or other flexible members can pass. It is however to be understood that sections of other than tubular form could be used as the frame members. For example the frame members could be composed of sections of channel form or even of angled form both of which would provide an inner, although not enclosed, space for passage of the cables or other flexible elements.

Although the cables or other flexible elements could be wound onto drums or other spools carried by the frame and which can be driven to extend and retract the cables, it is preferred that they are linked to an endless drive chain or drive belt to overcome problems which might arise from non-uniform cable extension and retraction if the cables become unevenly wound on the drums or other spools.

Advantageously, substantially all of the elementary drive system for the cables or other flexible elements can be contained within the structure of the frame except for an external drive handle (when the system is manually powered) or an external drive motor (when the system is power operated).

Advantageously, the lifting system is predominantly self-contained so that it can easily be mounted on appropriate mounting brackets installed on the vehicle and readily removed therefrom for storage purposes when not required.

Advantageously, the mounting for the system can be such that the frame, together with the platform releasably locked thereto, may be swung from its operative position into a storage position in which the frame and platform extend substantially vertically to form a tailgate for the vehicle. The platform may be of unitary construction or comprise a frame with removable or foldable platform elements to provide a platform of variable depth, and a tailgate of variable height when moved into the inoperative position.

BRIEF DESCRIPTION OF THE DRAWINGS

Embodiments of the invention will now be described by way of example only with reference to the accompanying drawings in which.

DETAILED DESCRIPTION OF THE PREFERRED EMBODIMENT

As shown in FIGS. 1 to 5 of the accompanying drawings a lifting system for installation at the rear of a load-carrying vehicle having a tray 2, for example a vehicle such as a so-called "ute" or small truck, comprises a generally U-shaped support frame 4 mounted to the rear of the vehicle so as to be pivotal between an operative position (FIGS. 1 and 2) in which it extends substantially horizontally and level with the tray 2 and inoperative position (FIG. 3) in which it extends vertically upwardly from the rear of the vehicle tray 2. The vehicle also carries a suitable structure to releasably secure the frame 4 in its operative and inoperative positions. In the particular form shown, the frame 4 is supported at each side by pivotal and foldable struts 6 which, in the operative position of the frame 4, extend in tension between the rear end of the frame 4 and vertical up right members 8 fixed to the vehicle in a manner which will be described subsequently.

Instead of using struts 6 to hold the frame 4 in its operative position, the frame 4 may be held in its operative position by cables extending rearwardly from the vertical upright members 8. Although the illustrated support arrangement is preferred for reasons of compactness, in an alternative arrangement the frame 4 could be supported in its operative position by bracing struts acting in compression between the frame 4 and a support structure extending beneath the tray 2 of the vehicle.

The U-shaped support frame 4 carries a load-carrying platform 16 suspended at its corner portions by cables 18a–18d extending from or near the corner portions of the support frame 4. The support frame 4 is composed of frame members of hollow section and comprising parallel side members 20 extending longitudinally rearwardly from the vehicle and a transverse member 22 extending between the forward ends of the frame members 20, and the cables 18a–18d form part of a cable system mounted within the hollow interior of the fame members 20,22 forming the U-shaped frame 4. The cable system may be manually or power operated to raise and lower the platform 16 relative to the support frame 4 from a lower position for example with the platform 16 resting on the ground, and an upper position in which the platform 16 is substantially level with the frame 4 and hence with the tray 2 of the vehicle. The cable system may take many different forms. However, a preferred form of manually-operated cable system will be described subsequently with reference to FIG. 5.

When the platform 16 is level with the U-shaped support frame 4, the platform 16 can be locked thereto for example by insertion of removable locking pins between the frame 4 and platform 16. When the platform 16 is locked to the frame 4 and the frame 4 is pivoted into its inoperative position, the platform 16 will be pivoted with the frame 4 and in this mode the platform 16 will also act as a tail gate for the flat bed of the vehicle (see FIG. 3). It is, however, to be noted that the locking pins are optional as the inherent nature of the cable system is likely to be such that uncontrolled movement of the platform 16 will not occur when the platform 16 is level with the frame 4.

Figure 5:
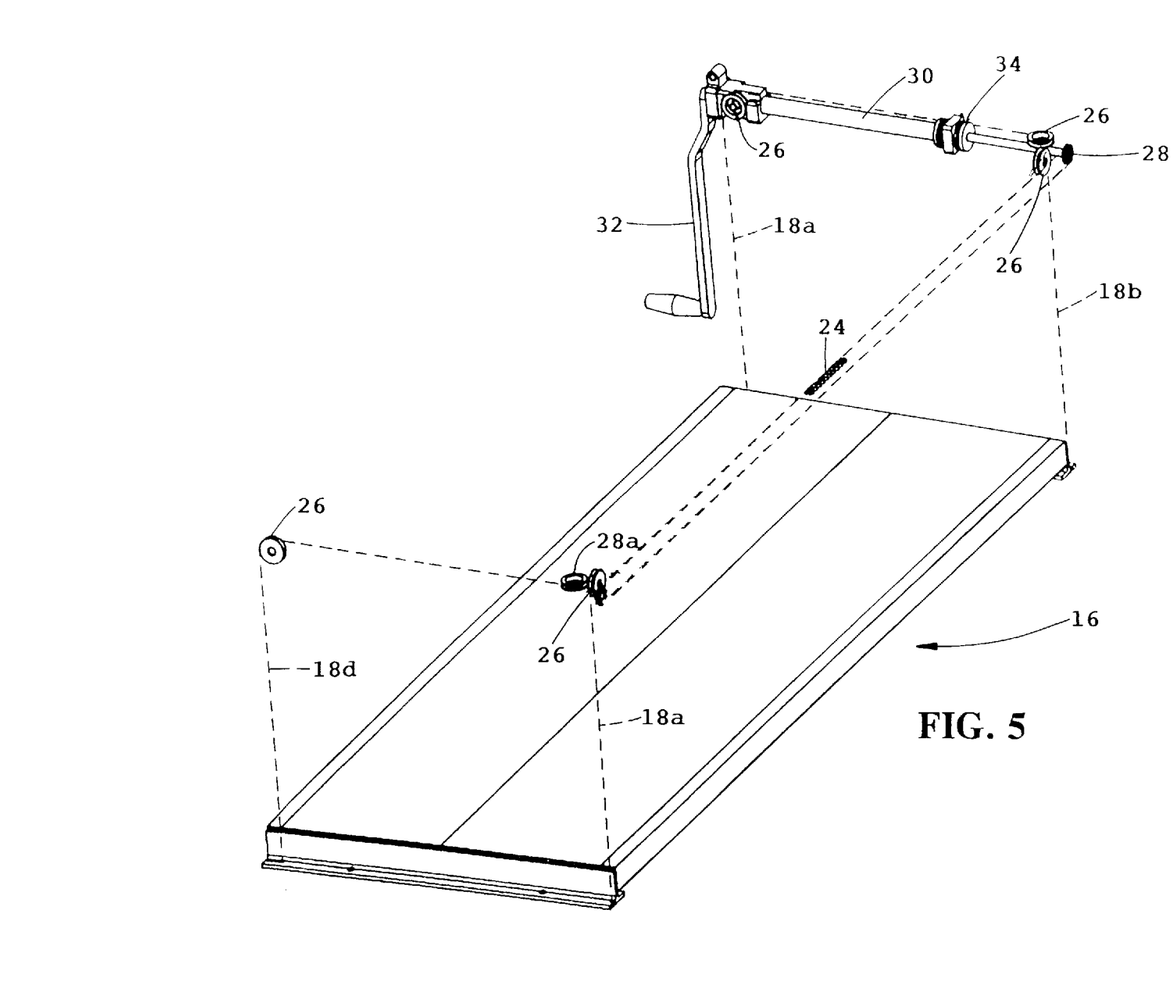
FIG. 5 is a perspective view illustrating in detail the arrangement of lifting cables within the system.

FIG. 5 illustrates a cable system comprising an endless inextensible chain or belt 24 mounted within the transverse frame member 22 and to which the four cables 18a–18d are attached, each cable extending over one or more pulleys 26 in the frame 4 to the respective corner portions of the platform 16. The chain 24 is driven by a driving sprocket 28 coupled by a drive shaft 30 to a handle 32, the shaft 30 extending through one of the side frame members 20 and the handle 32 being at the rear of that frame member. The shaft 30 is associated with a braking device 34 to prevent unintended lowering of the platform 16 under the effect of the load carried by the platform 16. This embodiment has the advantage that all four cables 18a–18d, due to their attachment to the chain or belt 24, are pulled through exactly the same distance and are subject to the same tension. In contrast in a cable systems comprising cable drums or spools on which the respective cables are wound and released to raise and lower the platform 16, difficulties may sometimes arise in always ensuring uniform winding of the cables onto the drum or spool which may result in uneven tension and possible tilting of the platform. It is to be noted that although the cables 18a–18d can consist of four separate cables, in practice the cables 18a and 18b (and similarly 18c and 18d) can be formed by a single cable attached at an intermediate point along its length to the chain 24, with the respective parts of the cable forming each one of the two cables 18a, 18b.

A suitable form of braking device 34 is known per se for use in certain hand-operated winches and comprises a ratchet and pawl which operates in conjunction with brake pads which are periodically engaged and released by driving rotation of the handle 32 in either direction to ensure that the platform 16 cannot self-lower under the loading carried by the platform. Alternatively, the handle 32 can operate the driving sprocket 28 via a geared transmission system having inherent friction characteristics which ensure that the platform 16 cannot self-lower under the effect of the load carried by the platform 16. In yet another alternative, the braking device can comprise a uni-directional bearing.

Although the cable system particularly described is designed for manual operation, the system could readily be converted for powered operation for example by an electric or hydraulic motor mounted at a convenient position on the U-shaped frame 4 and coupled via a drive shaft or other appropriate transmission to the driving sprocket 28.

Advantageously, the frame members 20 and 22 which form the basic structure of the U-shaped frame 4 are assembled together by means of corner connectors 40 (FIGS. 4 and 6) which also mount the cable pulleys 26 present at the corners and the driving sprocket 28 and an associated idler sprocket 28a around which the chain or belt 24 is entrained. The two corner connectors 40 are of identical construction, with the design of the corner connector being such that it can be used at either the left hand or right hand corner of the frame 4. The corner connector 40 is illustrated in detail in FIG. 6. As shown in that figure the connector is of approximately L-shaped form with two limbs 42, 44 which are received respectively in the transverse frame member 22 and the side frame member 20. The limb 44 of the corner connector 40 incorporates upper and lower journals 46 for a cable pulley 26. In the operative condition of the connector 40, the pulley 26 will only be mounted on the upper of the two journals 46; as previously mentioned the corner connector 40 can be used either at the right hand or left hand corner of the frame 4 and this is achieved simply by inverting the connector from the orientation shown in FIG. 6 whereby the lower of the two journals 46 when in the orientation shown will be uppermost in the inverted orientation. The other limb 42 of the corner connector 40 also incorporates a journal 46 for a cable pulley 26. The rear of the limb 42 is of channel section to permit passage of the endless chain or belt 24. When the corner connector is associated with the drive shaft 30, the forward end portion of the drive shaft 30 extends through the limb 44 to terminate in the driving sprocket 28 which lies within the interior of the corner connector 40 in mesh with the chain or belt 24. When used at the other corner of the frame 4, this limb of the corner connector will carry a mounting shaft for the idler sprocket 28a which lies within the interior of the corner connector in a corresponding position to the drive sprocket. The limb 44 of the corner connector 40 also has a socket 48 for receiving a bearing either for mounting the drive shaft 30 or the mounting shaft of the idler sprocket 28a depending on which side of the frame the connector is installed.

Figure 6:
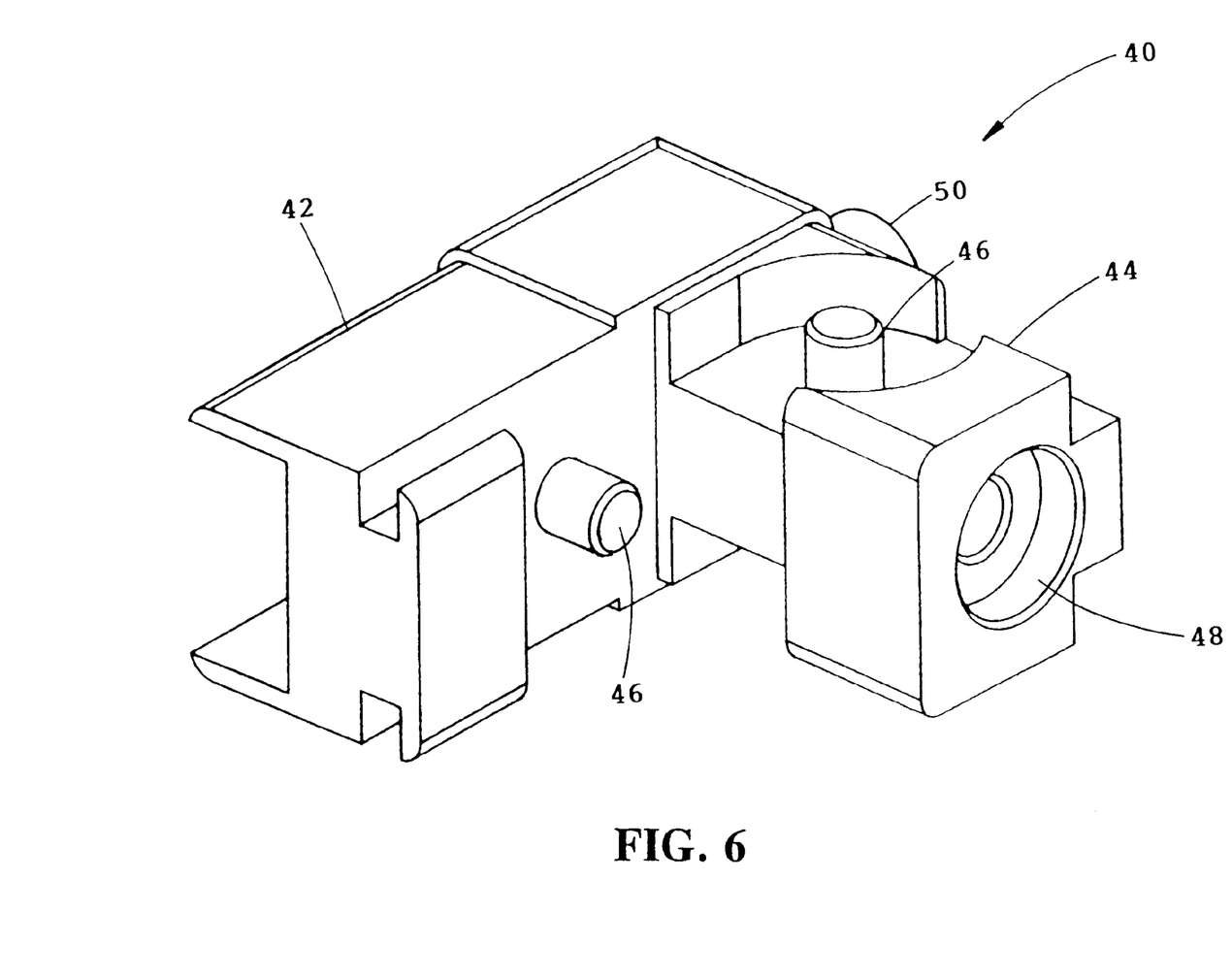
FIG. 6 is a perspective view of a corner connector used within the frame.

The corner connector 40 also incorporates a horizontal hinge pin 50 for mounting the frame 4 for pivotal movement between its operative position and raised inoperative position as will be described subsequently.

Figure 7:
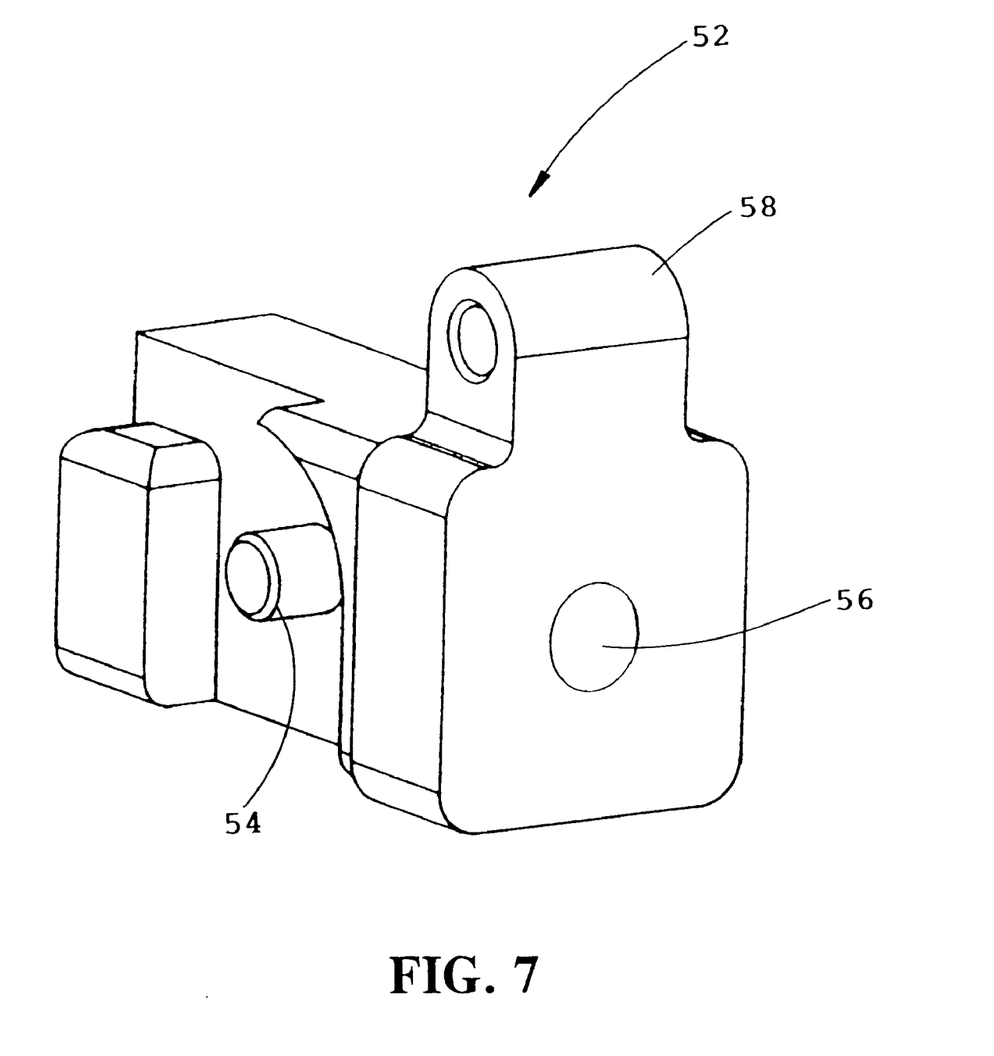
FIG. 7 is a perspective view of an end fitting used in the frame.

The structure of the frame 4 also includes an end fitting 52 which is inserted into the rear end portion of each side frame member 20, the end fitting 52 being constructed for use at either side of the frame 4. The end fitting 52 is shown in detail in FIG. 7. The end fitting 52 has at each side a journal 54 for a cable pulley 26. The two journals 54 are included to enable the same fitting to be used at each side of the frame although in practice, when in use, a cable pulley 26 will be fitted only onto one of the two journals. The end fitting 52 also is formed with a longitudinal passage 56 to enable it to receive the drive shaft 30 and an end bearing for the drive shaft 30 when the end fitting 52 is mounted at the side of the frame 4 incorporating the drive shaft. The end fitting also includes a projecting portion 58 for receiving a pivot bolt for the outer end of the bracing strut 6. It is to be noted that when the bracing strut 6 and cable pulley 26 are fitted to the end fitting 52, the strut 6 and pulley 26 may lie in the same vertical plane and this will avoid twisting of the frame 4 under the effects of load; however in the embodiment illustrated, this option is not present.

Figure 4:
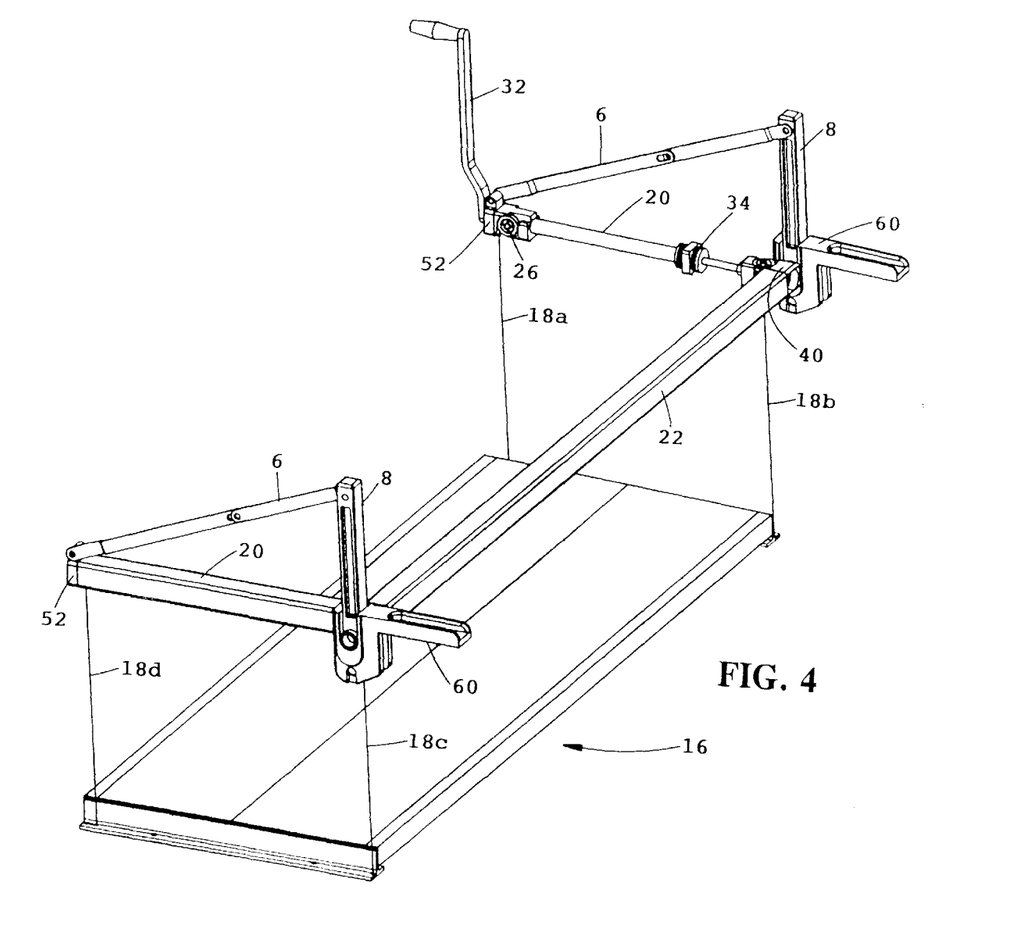
FIG. 4 is a perspective view showing the components of the system in greater detail, part of a U-shaped support frame of the system being removed to show internal structure.
Figure 8:
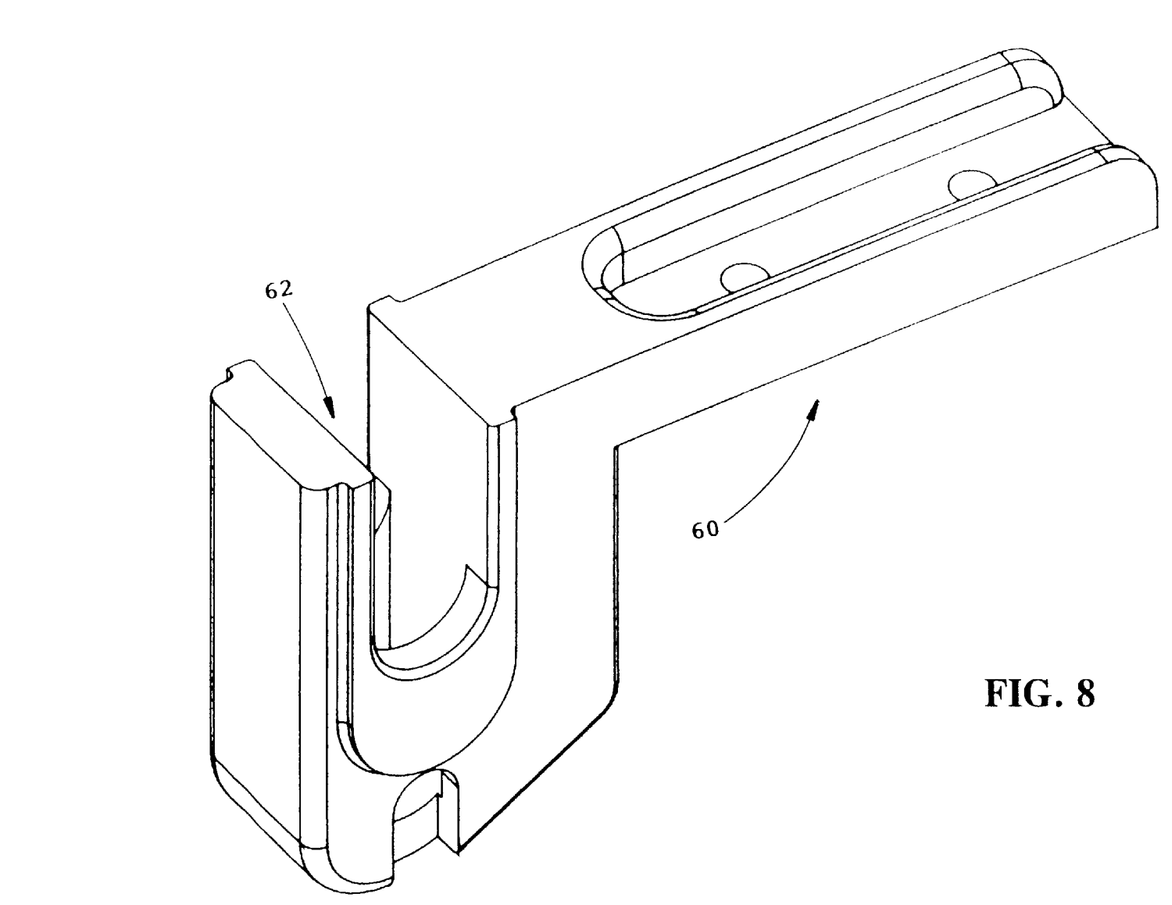
FIG. 8 is a perspective view of a mounting bracket used to attach the system to the vehicle.
Figure 9:
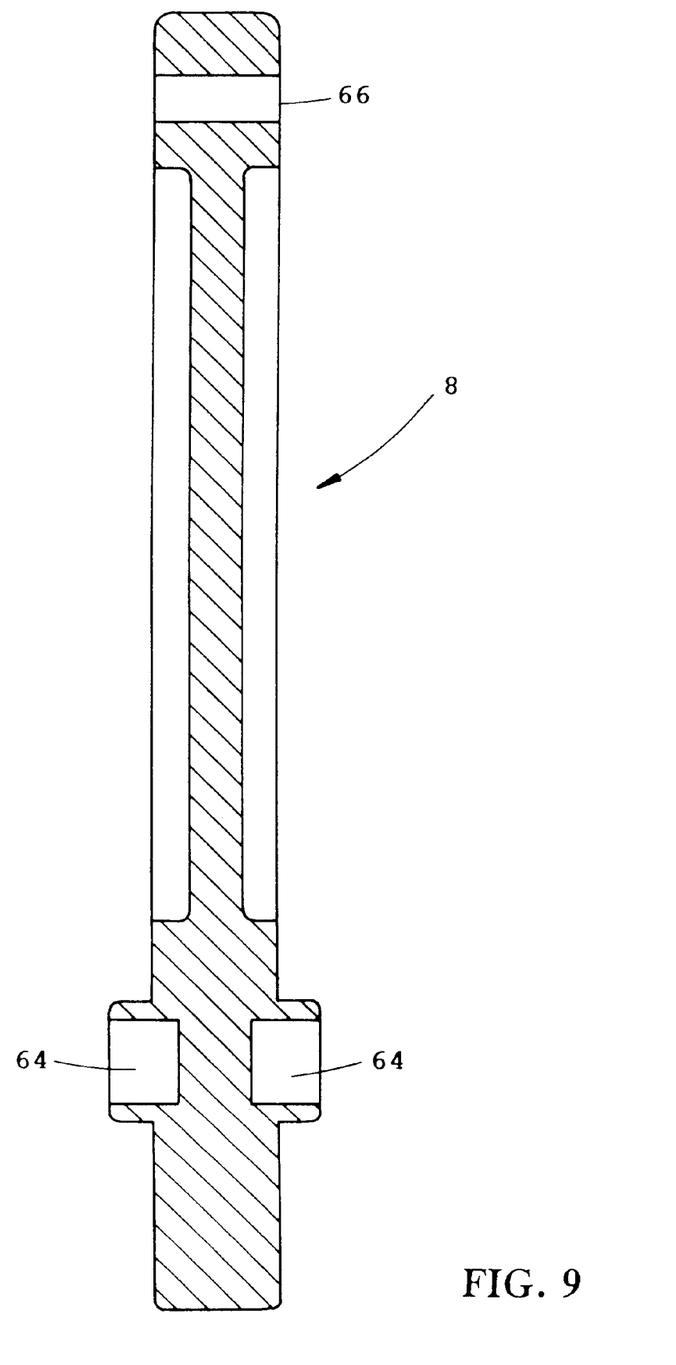
FIG. 9 is a vertical section through an upright support member of the system.

The frame 4 is mounted to the tray of the vehicle by a pair of mounting brackets 60 (see FIGS. 4 and 8). The rear part of the bracket 60 defines a socket 62 into which can be slid the lower end portion of the corresponding upright member 8 by movement of the upright member 8 down into the socket 62. The upright member 8 includes a horizontal socket 64 (see FIG. 9) for receiving the hinge pin 50 of the corresponding corner connector 40 whereby the frame 4 is pivotally mounted to the two upright members 8 for movement between its operative and inoperative positions, the struts 6 folding to accommodate this movement. At its upper end, the upright member 8 has a passage 66 for receiving a pivot bolt at the forward end of the bracing strut 6. The frame 4 is assembled to the two upright members 8 and bracing struts 6 to form a complete self-contained sub-assembly incorporating the platform 16; this sub-assembly can be simply mounted into and removed from the vehicle by engaging the lower ends of the upright members 8 into the sockets 62 in the mounting brackets 60 and then removed from the vehicle for storage purposes by lifting out of these sockets.

Figure 1:
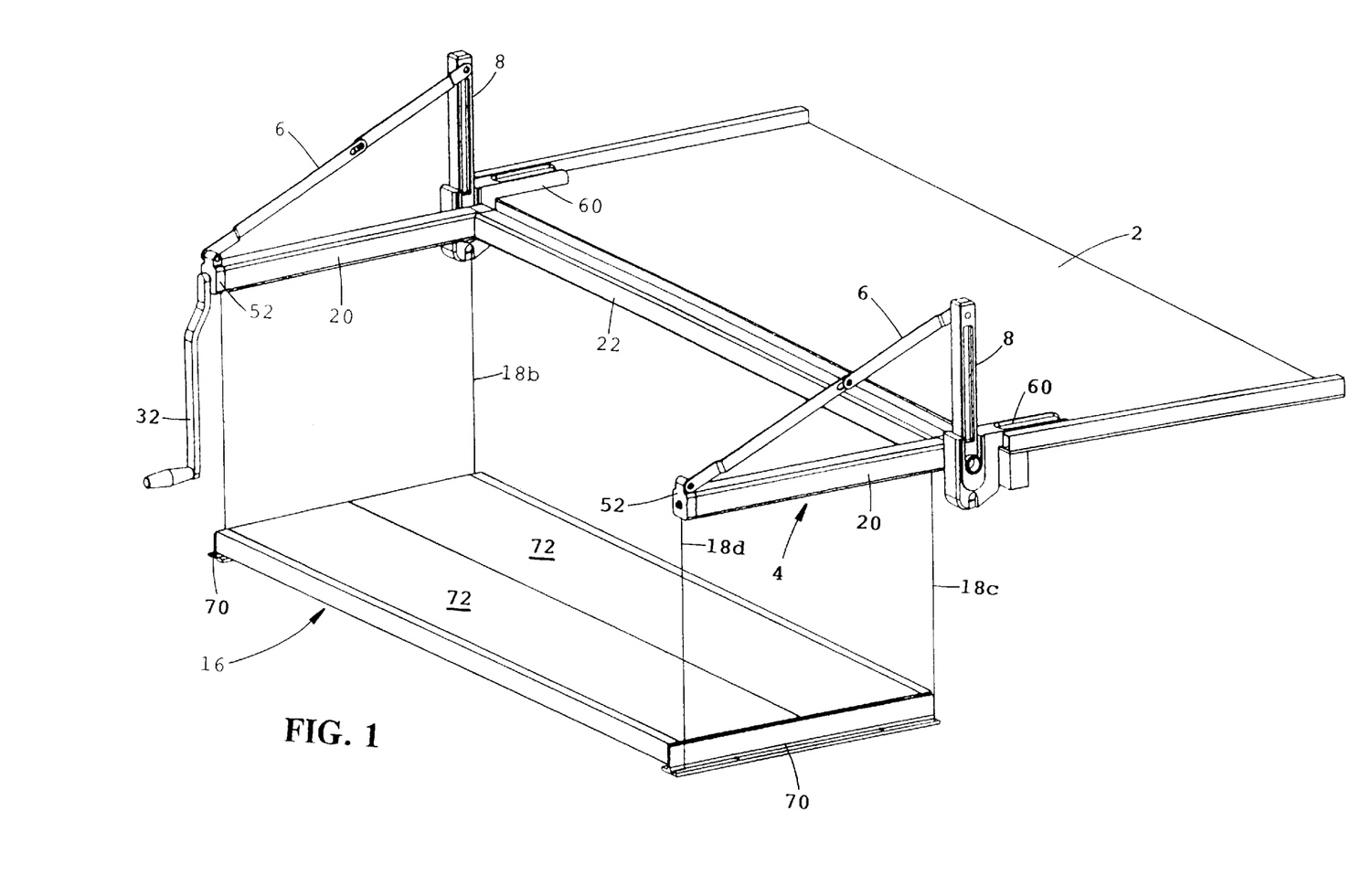
FIG. 1 is a schematic view of a lifting system in accordance with a preferred embodiment of the invention shown in a condition attached to the rear of a vehicle, a lifting platform of the system being shown in a lowered position adjacent the ground.
Figure 2:
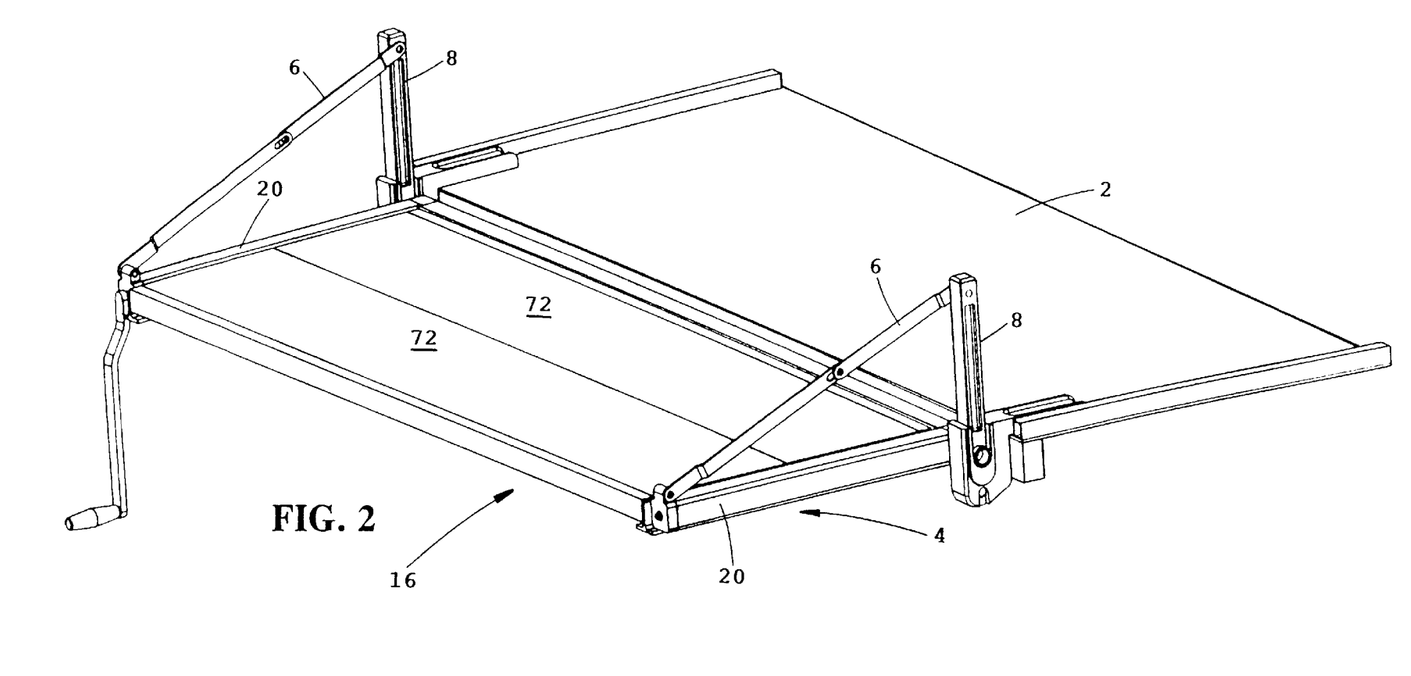
FIG. 2 is a view similar to FIG. 1 but showing the lifting platform in its raised position substantially level with a load-carrying tray of the vehicle.
Figure 3:
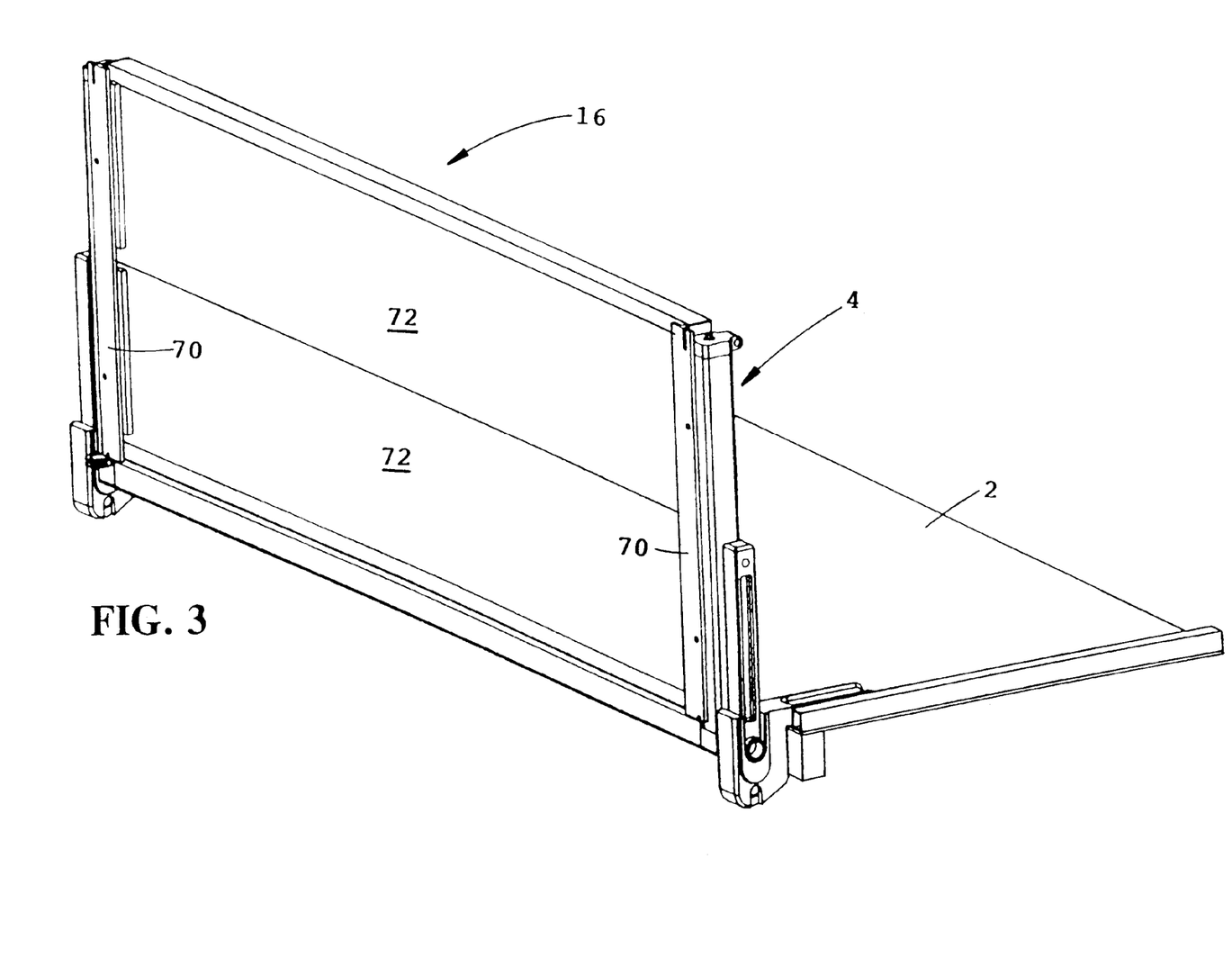
FIG. 3 is a schematic view showing the lifting system in an inoperative position in which it acts as a tail gate for the vehicle.

As mentioned previously, when the platform 16 is level with the U-shaped support frame 4, the frame 4 can be pivoted into its inoperative position whereby the platform 16 will be pivoted with the frame 4 and in this mode the platform 16 will also act as a tail gate for the flat bed of the vehicle (see FIG. 3).

Figure 10:
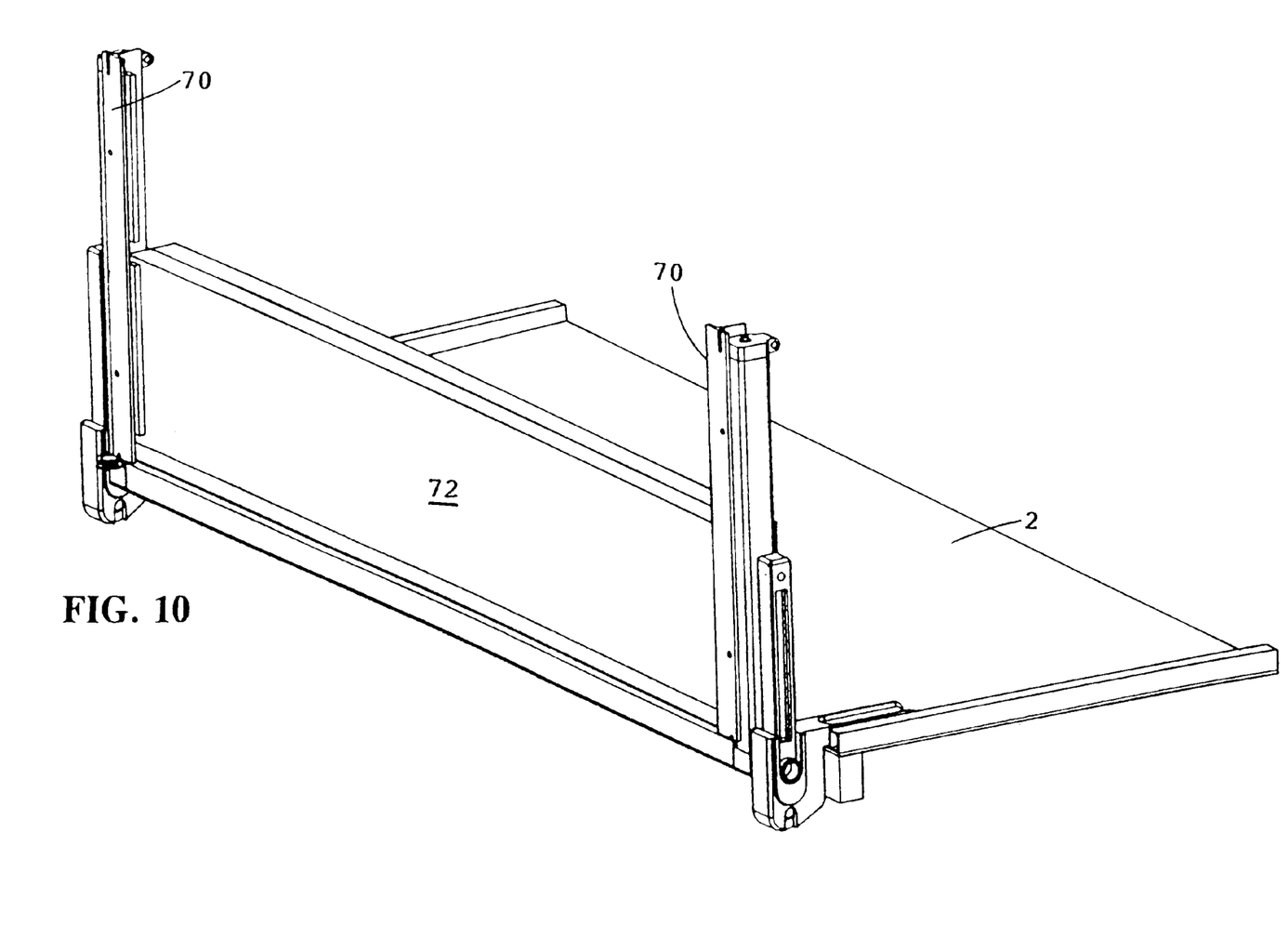
FIG. 10 is a schematic view similar to FIG. 3, in which the platform forms a tail gate of reduced height.

The platform 16 may consist of a unitary structure or alternatively, and as illustrated, the platform 16 may consist of an outer support frame 70 supporting removable or foldable platform elements 72 each extending across the width of the frame 70 to thereby provide a platform of reduced length (as considered in an outwards direction) and hence also a tail gate of reduced height (see FIG. 10) when raised into its storage position. A system with removable platform elements 72 has additional advantage in that the platform elements, when removed from the platform frame 70, can be used as ramps extending from the rear of the vehicle tray to the ground and along which a small vehicle such as a 4 WD motor cycle can be driven for loading onto and from the tray.

Figure 11:
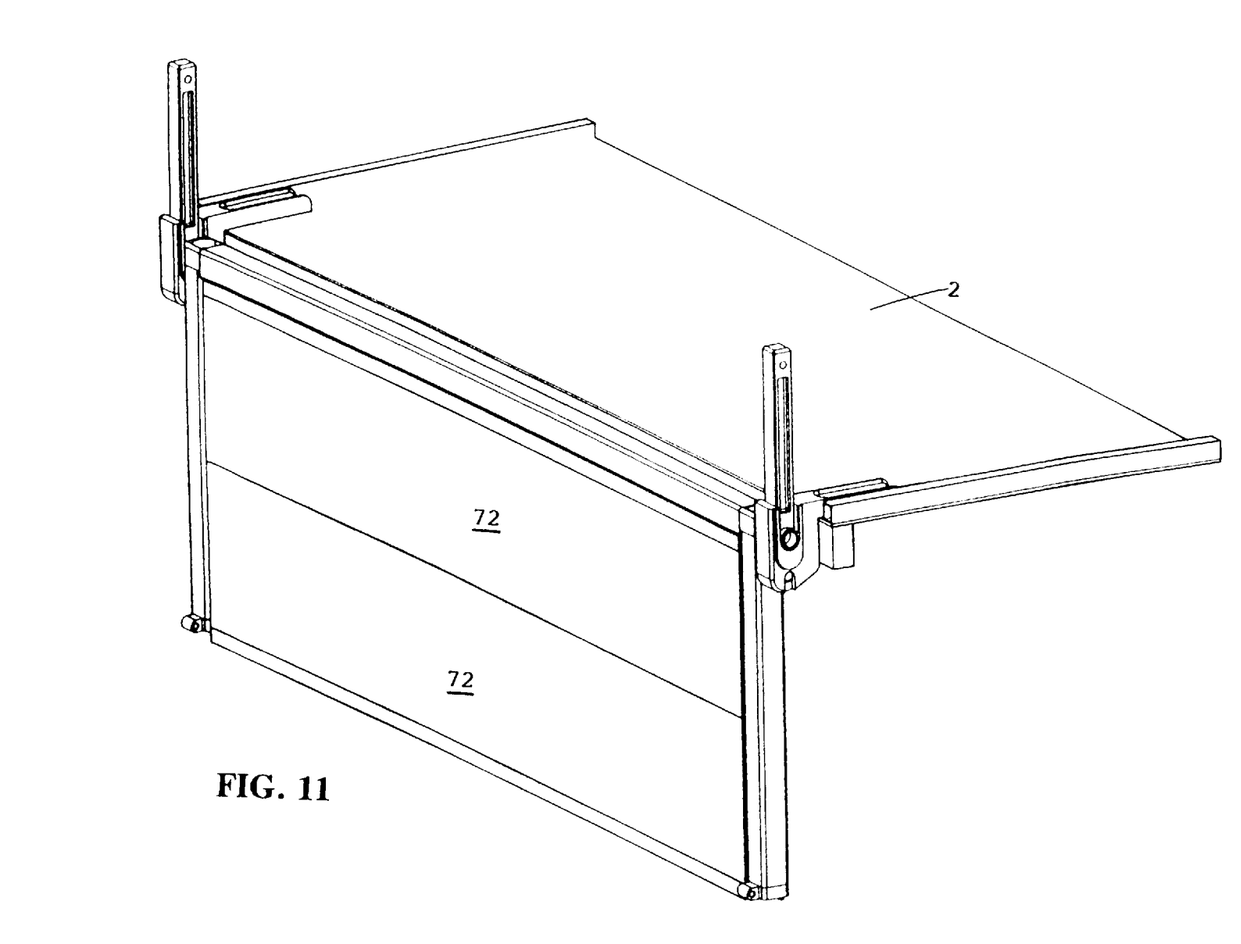
FIG. 11 is a schematic view showing the lifting system in an alternative inoperative position.

Instead of pivoting the platform 16 and frame 4 upwardly into its inoperative position, it may be pivoted downwardly as shown in FIG. 11 after removal or disconnection of the bracing struts 6. In this mode the vehicle can be loaded by backing against a loading dock without the need to remove the platform or the entire lifting system from the vehicle.

It is to be noted that the lifting system of the preferred embodiment is of extremely compact construction in that with the exception of the operating handle or a drive motor (in the case of a powered system) all of the components of the lifting mechanism are mounted within the interior of the U-shaped frame 4. Thus there is absence of substantial external structure which is likely to impede access when using the system and also the system is very compact when stored. The platform 16 is carried only by means of the cables without the need for any mechanical linkage system between the platform 16 and frame 4 to provide guidance and which would result in unnecessary external structure. The positioning of the four cables ensures that the platform will remain level during its vertical movement even with uneven load distribution on the platform. Also, as the platform is supported just by means of the cables, when the platform is lowered to the ground the cables can be unwound to a sufficient extent for the platform to lie flat even if the ground is uneven or is sloping.

Although reference has been made herein to the use of cables for suspending the platform, it is to be understood that any suitable type of flexible, substantially inextendible, element capable of carrying the load could be used instead, for example rope, chain, webbing or strap.

Although the lifting system has been described as being mounted at the rear of the vehicle, for some applications the system may be mounted at the side of the vehicle.

The lifting system described herein can be used to raise or lower loads onto or from the bed of the vehicle, a typical system constructed in accordance with the principles described having a lifting capacity up to about 600 kg. It is of relatively simple construction which can be produced at considerably less cost than existing hydraulically-operated lifting platforms. Existing vehicles can readily be adapted to carry the system by attaching suitable brackets 60.

The embodiments have been described by way of example only and modifications are possible within the scope of the invention.

What is claimed is:

1. A lifting system for attachment to a vehicle having a load-carrying tray, said system comprising:
   a support frame arranged for attachment to the vehicle, said support frame comprising opposed longitudinal frame members interconnected at their inner ends by a transverse frame member adapted to lie adjacent the vehicle tray whereby the frame is of generally U-shape open at an outer side;
   means for mounting the frame for pivotal movement of the frame about a generally horizontal axis parallel to the transverse frame member such that the frame is pivotal between an operative position in which the frame extends substantially horizontally outwardly relative to the tray and a stowed position in which the frame extends substantially vertically relative to the tray;
   a load-carrying platform structure suspended from the support frame by several flexible elements; and
   drive means for extending and retracting the flexible elements relative to the support frame so as to raise and lower the platform structure vertically relative to the frame between a position in which the platform structure is adjacent the tray and a position in which the platform structure is adjacent the ground, the flexible elements maintaining the platform structure in a substantially horizontal orientation during its vertical movement.

2. A lifting system for attachment to a vehicle having a load-carrying tray, said system comprising:
   a support frame arranged for attachment to the vehicle, said support frame comprising opposed longitudinal frame members interconnected at their inner ends by a transverse frame member adapted to lie adjacent the vehicle tray whereby the frame is of generally U-shape open at an outer side;
   means for mounting the frame for pivotal movement of the frame about a generally horizontal axis at an inner side of the frame such that the frame is pivotal between an operative position in which the frame extends substantially horizontally outwardly relative to the tray and a stowed position in which the frame extends substantially vertically relative to the tray;
   a load-carrying platform structure suspended from the support frame by several flexible elements; and
   drive means for extending and retracting the flexible elements relative to the support frame so as to raise and lower the platform structure vertically relative to the frame between a position in which the platform structure is adjacent the tray and a position in which the platform structure is adjacent the ground, the flexible elements maintaining the platform structure in a substantially horizontal orientation during its vertical movement;
   wherein the platform structure comprises a platform frame to which the flexible elements are attached, said platform frame carrying a plurality of platform members extending across the platform frame transverse to the longitudinal frame members of the support frame, the platform members defining the load-carrying surface of the platform structure in the operative position of the support frame, and at least one of the platform members being movable relative to the platform frame whereby in the stowed position of the support frame in which the platform structure is adjacent the support frame and is also vertically directed, the effective height of the vertically-directed platform structure relative to the vehicle tray can be reduced.

3. A lifting system according to claim 2, wherein the flexible elements comprise at least one selected from the group consisting of cables, chains, ropes, webbing or straps.

4. A lifting system according to claim 3, wherein each flexible element has a first end linked to the platform frame and a second end linked to the drive means actuatable to cause extension and retraction of the flexible element.

5. A lifting system according to claim 4, wherein the drive means comprises an endless inextensible loop mounted for movement along a predetermined path, the second ends of the flexible elements being linked to the loop such that driving movement of the loop in one direction causes retraction of the flexible elements whereby to raise the platform structure and movement in the opposite direction causes extension of the flexible elements whereby to lower the platform structure.

6. A lifting system according to claim 5, wherein the endless loop comprises a chain or belt.

7. A lifting system according to claim 5, wherein the endless loop is mounted within the interior of one of the frame members.

8. A lifting system according to claim 7, wherein the endless loop is mounted within the interior of the transverse frame member.

9. A lifting system according to claim 4, further comprising a manually actuated drive carried by the support frame for operating the drive means.

10. A lifting system according to claim 9, wherein the manually actuated drive comprises a drive shaft extending along one of the frame members through the interior thereof.

11. A lifting system according to claim 10, wherein the drive shaft extends along one of the longitudinal frame members from a drive handle at the outer end of that frame member.

12. A lifting system according to claim 4, wherein each of the frame members is of tubular form, the inner ends of the two opposed longitudinal frame members being linked to the adjacent end of the transverse frame member by a corner connector which mounts at least one guide element for passage of one or more of the flexible elements.

13. A lifting system according to claim 12, wherein the frame is pivotally mounted for swinging movement between its operative and stowed positions by horizontally directed pivots carried by the corner connectors.

14. A lifting system according to claim 4, wherein the outer end of each of the longitudinal frame members carries an end fitting including a guide element for an associated one of the flexible elements.

15. A lifting system according to claim 4, wherein said one platform member is pivotally mounted in the platform frame.

16. A lifting system according to claim 4, wherein the flexible elements form the sole means by which the platform structure is guided during its raising and lowering movement.

17. A lifting system according to claim 16, wherein respective ones of the flexible elements can be extended sufficiently to allow the platform structure to lie flat against sloping or uneven ground.

18. A lifting system according to claim 2, wherein when in the stowed position the support frame and platform structure form a tail gate for the vehicle which can be opened by pivoting the support frame to said operative position.

19. A lifting system according to claim 18, wherein the support frame together with the platform structure when adjacent the support frame can also be pivoted downwardly about said axis to a position in which the support frame and platform structure extend substantially vertically downwardly from the tray of the vehicle.

20. A lifting system according to claim 19, further comprising a support structure attachable to the vehicle, the support structure comprising upright support members and bracing means extending between the upright support members and the longitudinal frame members of the support frame.

21. A lifting system according to claim 20, wherein the support structure further comprises mounting means fixedly attachable to the vehicle, and wherein the support frame, platform structure, drive means, upright support members, and bracing means form a unitary assembly which can be engaged with and released from the mounting means whereby to permit removal from the vehicle for storage purposes.

22. A lifting system according to claim 20, wherein the frame is pivotally mounted to the upright support members for pivotal movement between its operative and stowed conditions.

23. A lifting system according to claim 4, wherein said platform member is removable from the platform frame.

24. A lifting system for attachment to a vehicle having load-carrying tray, said system comprising:
    a support frame arranged for attachment to the vehicle, said support frame comprising opposed longitudinal frame members interconnected at their inner ends by a transverse frame member adapted to lie adjacent the vehicle tray whereby the frame is of generally U-shape open at an outer side;
    means for mounting the frame for pivotal movement of the frame about a generally horizontal axis at an inner side of the frame such that the frame is pivotal between an operative position in which the frame extends substantially horizontally outwardly relative to the tray and a stowed position in which the frame extends substantially vertically relative to the tray;
    a load-carrying platform structure suspended from the support frame by several flexible elements; and
    drive means for extending and retracting the flexible elements relative to the support frame so as to raise and lower the platform structure vertically relative to the frame between a position in which the platform structure is adjacent the tray and a position in which the platform structure is adjacent the ground, the flexible elements maintaining the platform structure in a substantially horizontal orientation during its vertical movement;
    wherein the flexible elements are retracted by operation of the drive means into a storage zone defined within the periphery of the support frame.

25. A lifting system according to claim 24, wherein the storage zone is defined by a hollow interior of one of said frame members forming the support frame.

26. A lifting system for attachment to a vehicle having load-carrying tray, said system comprising:
    a support frame arranged for attachment to the vehicle, said support frame comprising opposed longitudinal frame members interconnected at their inner ends by a transverse frame member adapted to lie adjacent the vehicle tray whereby the frame is of generally U-shape open at an outer side;
    means for mounting the frame for pivotal movement of the frame about a generally horizontal axis at an inner side of the frame such that the frame is pivotal between an operative position in which the frame extends substantially vertically relative to the tray;
    a load-carrying platform structure suspended from the support frame by several flexible elements; and
    drive means for extending and retracting the flexible elements relative to the support frame so as to raise and lower the platform structure vertically relative to the frame between a position in which the platform structure is adjacent the tray and a position in which the platform structure is adjacent the ground, the flexible elements maintaining the platform structure in a substantially horizontal orientation during its vertical movement;
    wherein each flexible element has a first end linked to the platform structure and a second end linked to the drive means to cause extension and retraction of the flexible element, the drive means being mounted by the support frame.

27. A lifting system according to claim 26, wherein the drive means retracts the second end portions of the flexible elements into a storage zone formed within the support frame or formed by the drive means.

28. A lifting system according to claim 27, wherein the storage zone is defined within a hollow interior of one of the frame members.

29. A lifting system for attachment to a vehicle having a load-carrying tray, said system comprising:
    support frame arranged for attachment to the vehicle, said support frame comprising opposed longitudinal frame members interconnected at their inner ends by a transverse frame member adapted to lie adjacent the vehicle tray whereby the frame is of generally U-shape open at an outer side;
    means for mounting the frame for pivotal movement of the frame about a generally horizontal axis at an inner side of the frame such that the frame is pivotal between an operative position in which the frame extends substantially horizontally outwardly relative to the tray and a stowed position in which the frame extend substantially vertically relative to the tray;

a load-carrying tray platform structure suspended from the support frame by several flexible elements; and drive means for extending and retracting the flexible elements relative to the support frame so as to raise and lower the platform structure vertically relative to the frame between a position in which the platform structure is adjacent the tray and a position in which the platform structure is adjacent the ground, the flexible elements maintaining the platform structure in a substantially horizontal orientation during its vertical movement;

wherein the support frame, platform structure, flexible elements, and drive means form a unitary structure removably mounted as a unit in supports fixedly attached to the vehicle.

30. A lifting system for attachment to a vehicle having a load-carrying tray, said system comprising:

a support frame arranged for attachment to the vehicle, said support frame comprising opposed longitudinal frame members interconnected at their inner ends by a transverse frame member adapted to lie adjacent the vehicle tray whereby the frame is of generally U-shape open at an outer side;

means for mounting the frame for pivotal movement of the frame about a generally horizontal axis at an inner side of the frame such that the frame is pivotal between an operative position in which the frame extends substantially horizontally outwardly relative to the tray and a stowed position in which the frame extends substantially vertically relative to the tray;

a load-carrying platform structure suspended from the support frame by several flexible elements; and drive means for extending and retracting the flexible elements relative to the support frame so as to raise and lower the platform structure vertically relative to the frame between a position in which the platform structure is adjacent the tray and a position in which the platform structure is adjacent the ground, the flexible elements maintaining the platform structure in a substantially horizontal orientation during its vertical movement;

wherein the platform structure comprises a platform frame to which the flexible elements are attached, said platform frame carrying a plurality of platform members extending across the platform frame transverse to the longitudinal frame members of the support frame, the platform members defining the load-carrying surface of the platform structure in the operative position of the support frame, and at least one of the platform members being movable relative to the platform frame whereby in the stowed position of the support frame in which the platform structure is adjacent the support frame and is also vertically directed, the effective height of the vertically-directed platform surface relative to the vehicle tray can be reduced, and a storage zone defined within the periphery of the support frame and into which the flexible elements are retracted by operation of the drive means.

* * * * *